July 24, 1962 J. L. BONANNO 3,045,551
REAR-VIEW MIRROR
Filed Feb. 24, 1959
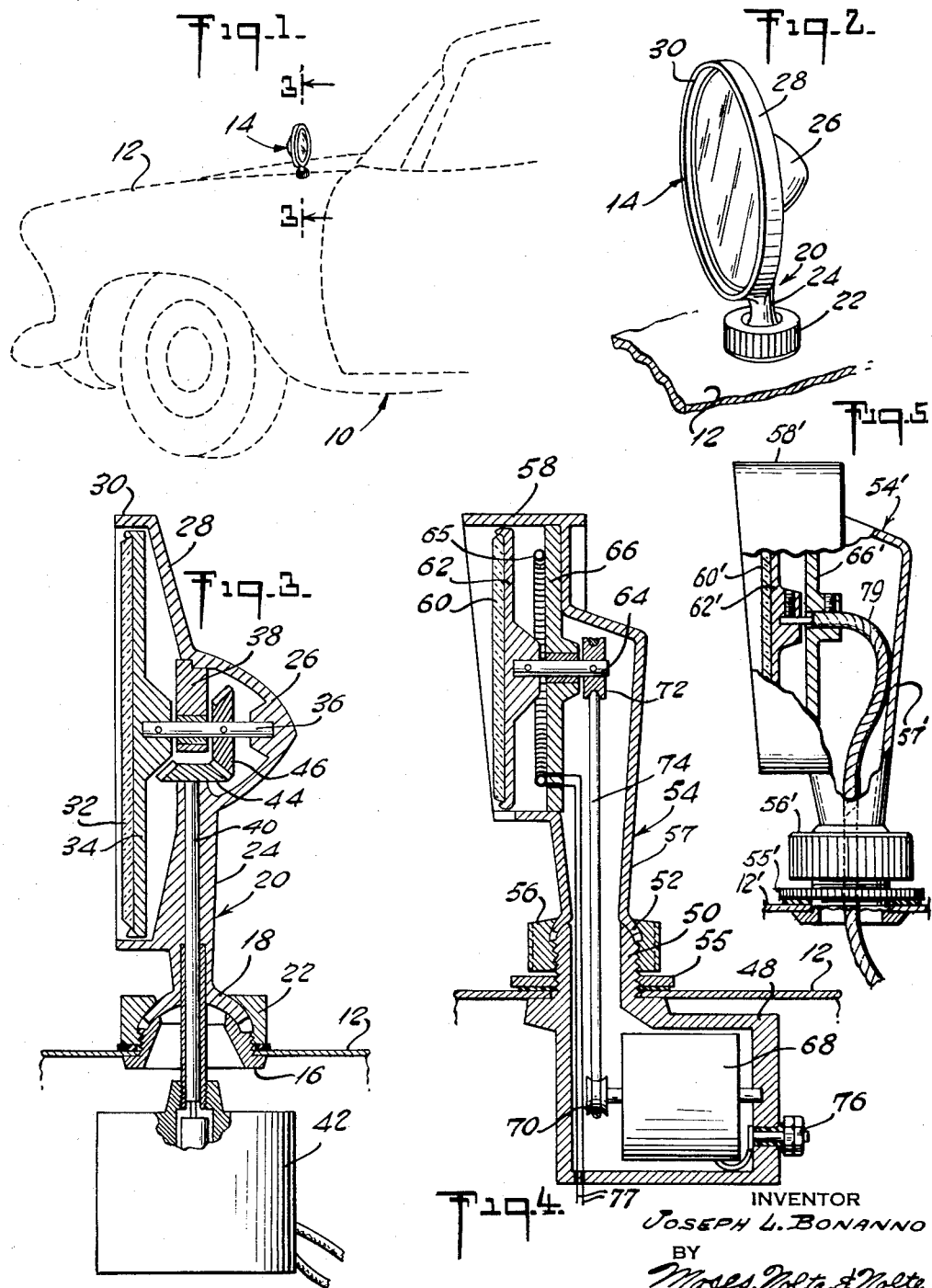
INVENTOR
JOSEPH L. BONANNO
BY
Moses, Nolte & Nolte
ATTORNEYS

United States Patent Office 3,045,551
Patented July 24, 1962

3,045,551
REAR-VIEW MIRROR
Joseph L. Bonanno, South Orange, N.J., assignor to The Lionel Corporation, New York, N.Y., a corporation of New York
Filed Feb. 24, 1959, Ser. No. 795,175
2 Claims. (Cl. 88—98)

This invention relates in general to mirrors and particularly to a new and useful rear-view automobile-type mirror including means for maintaining the reflective portion free of obscuring substances such as rain, snow or sleet.

With the usual rear-view mirrors which are located outside the driver's window of a vehicle, the mirror becomes obscured and useless during a rain or snow-storm of any consequence. In accordance with the present invention, there is provided an inexpensive rear-view mirror which includes means to rotate the reflective portion in order to discharge by centrifugal force foreign substances which may become lodged on the reflective surfaces. The arrangement includes an extremely simple and economic construction for continuously rotating the mirrored glass by a small-sized electric motor.

Accordingly, an object of this invention is to provide an outdoor rear-view mirror having means for maintaining the reflective surfaces free of obscuring substances.

Another object of my invention is to provide an outdoor rear-view mirror free from rain, snow, sleet and the like, including means for melting or evaporating same from the surface of the mirror.

A further object of this invention is to provide an outdoor rear-view mirror for an automobile including means for rotating the reflective portion to discharge substances therefrom by centrifugal force.

A further object of this invention is to provide a rear-view mirror including means for rotating the reflective portion which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use reference should be had to the accompanying drawings and descriptive matter in which there is illustrated and described preferred embodiments of the invention.

In the drawings:

FIG. 1 is a fragmentary perspective view of an automobile having a rear-view mirror constructed in accordance with the invention;

FIG. 2 is an enlarged perspective view of the mirror shown in FIG. 1;

FIG. 3 is an enlarged transverse section of the mirror taken along line 3—3' of FIG. 1; and FIG. 4 is a transverse section similar to FIG. 3 of another embodiment of mirror constructed in accordance with the invention.

FIG. 5 is a traverse section similar to FIG. 3 of another embodiment of the mirror constructed in accordance with the invention.

Referring to the drawings in particular the invention as embodied therein includes an automobile 10 indicated in phantom having a left-front fender 12 upon which is mounted a rear-view mirror generally designated 14.

The rear-view mirror is held to the fender 12 by a collar member 16 which extends upwardly from the interior of the fender and is provided with a concave outer surface which receives a convex inner surface of a ball-socket end 18 of a mirror housing generally designated 20. The mirror housing 20 is held on the collar member 16 after it has been correctly angularly positioned by a securing collar 22 which is screwed onto the collar member.

The housing 20 includes a vertically elongated hollow central portion 24 which connects at its upper end to a dome-shaped portion 26 which is normally positioned to face in the facing direction of the automobile. The housing 20 includes an enlarged frusto-conical hollow portion 28 opposite from but symmetrically formed in respect to the dome-shaped portion 26. The frusto-conical hollow portion 28 joins a cylindrical hollow mirror receiving portion 30.

A disc-shaped glass-mirror 32 is affixed to a metal disc-shaped backing plate 34 which is rotatably mounted on a shaft 36. The shaft 36 is journalled at one end in the dome-shaped portion 26 and centrally on a depending bearing member 38 which extends downwardly from the juncture of the dome-shaped portion and the frusto-conical portion 28.

In accordance with the invention, the housing is provided with means to continuously rotate the backing plate 34 with its mirror 32, which includes an elongated vertical shaft 40 which is continuously rotated by a small-size electric motor 42. The shaft 40 is provided with a bevel gear 44 at its upper end which meshes with a similar bevel gear 46 affixed to the shaft 36 to continuously rotate the mirror 32.

The electric motor 42 is connected to a suitable control on the dash panel in the interior of the automobile to permit the operator to connect the electric motor to the battery energy source to rotate the mirror 32 whenever atmospheric conditions warrant. The continuous rotation of the mirror is effective to hurl foreign substances radially outwardly under the centrifugal force which is generated by the rotation.

In the embodiment illustrated in FIG. 4 there is provided a completely enclosed rotating mirror operating unit including a motor housing 48 having an upwardly extending stud portion 50 which extends through a suitable opening in the fender 12 and which is provided with a curved upper surface to receive the convex interior surface of a ball-socket end 52 of a mirror housing generally designated 54. The motor housing is secured in position by a screw collar 55, and the mirror housing is held in position after being adjusted angularly by a securing collar 56.

The housing 54 includes an elongated hollow portion 57 which joins a laterally extending cylindrical portion 58. The cylindrical portion 58 houses a mirror 60 which is affixed to a mirror backing plate 62.

In accordance with the invention, the mirror backing plate 62 is affixed to a shaft 64 which is rotatably journalled in a back wall 66 of the cylindrical portion 58.

Upon back wall 66 is affixed a heating element 65 to provide means to defrost mirror 60. Connected to the lower end of heating element 65 are electrical leads 77 which, in turn, are connected to a source of electrical energy not shown.

The shaft 64 is rotated by an electric motor 68 including a driving pulley 70 which drives a pulley 72 mounted on a shaft 64 through a belt 74. The complete unit contains an outside terminal bolt 76 to permit attachment to a suitable electrical energy source for actuation of the rotation mirror.

In the embodiment illustrated in FIG. 5, the rear-view mirror is held to fender 12' and is secured in position by collar 55'. The mirror housing is held in position after being angularly adjusted by a securing collar 56'. The housing includes an elongated hollow portion 57' which joins a laterally extending cylindrical portion 58'.

The cylindrical portion 58' houses a mirror 60' which is affixed to a mirror backing plate 62'. In accordance with the invention, the mirror backing plate 62' is affixed to flexible shaft 79 which is rotatably journalled in the back wall 66' of the cylindrical portion 58'. Flexible shaft 79 is connected to an electric motor not shown. In all other respects the device is the same as shown in FIG. 3.

Thus the invention provides an inexpensive rear-view mirror for an automobile or similar vehicle which includes means for continuously rotating the mirror to maintain the mirrored surface free of foreign substances. The device is extremely useful in rain or snow-storms as well as foggy conditions and operates effectively to hurl water, sleet and similar substances outwardly and maintain the viewing surfaces clear.

While a specific embodiment of the invention has been shown and described in detail to illustrate the application of the invention principles, it will be understood that the invention may be embodied otherwise without departing from such principles.

I claim:

1. A rear view mirror adapted for pivotal mounting on a body panel of a vehicle comprising a hollow housing having an open end, elongated tubular support means connected to said housing forming a passageway in communication with said housing and with the inside of the mounting vehicle body panel, a mirror support shaft rotatably mounted in said hollow housing, a mirror affixed to said shaft and rotatable therewith in the open end of said housing for rotation of said mirror about an axis perpendicular to the surface thereof, heating means mounted within said hollow housing near the rear surface of the mirror to maintain the mirror in defrost condition, pivotal mounting means at one end of said tubular support means for permitting angular adjustment of said housing relative to the vehicle body panel, drive means mounted from within the vehicle inside the body panel for rotating the mirror at a speed sufficient to discharge by centrifugal force foreign substances which may become lodged on said mirror, and having an output shaft, and torque transmitting means operatively extending from said drive means output shaft through said tubular support means to connect said drive means to said rotatable mirror support shaft.

2. A vehicle rear view mirror according to claim 1, wherein said torque transmitting means includes a driving pulley affixed to said drive means output shaft, and pulley and belt means connecting said driving pulley to said mirror support shaft.

References Cited in the file of this patent

UNITED STATES PATENTS

| | | |
|---|---|---|
| 2,565,256 | Myers et al. | Aug. 21, 1951 |
| 2,573,127 | Von Bredow | Oct. 30, 1951 |
| 2,724,995 | Matner | Nov. 29, 1955 |
| 2,737,852 | Porter et al. | Mar. 13, 1956 |
| 2,796,506 | Lumbert | June 18, 1957 |
| 2,862,420 | Hazelroth | Dec. 2, 1958 |